Nov. 20, 1934.  C. H. LOGUE  1,981,236
VARIABLE SPEED POWER TRANSMITTING MECHANISM
Filed Dec. 22, 1932  3 Sheets-Sheet 2
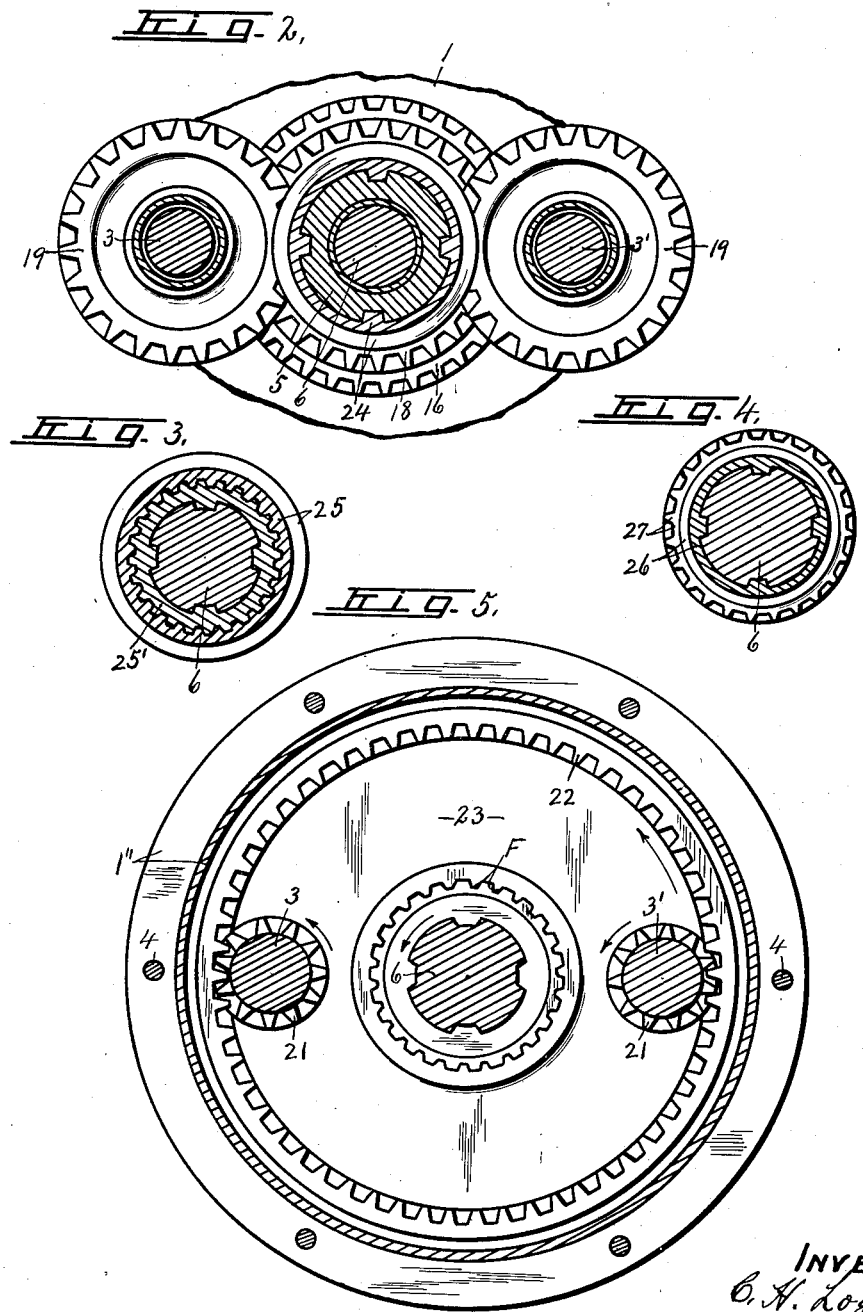

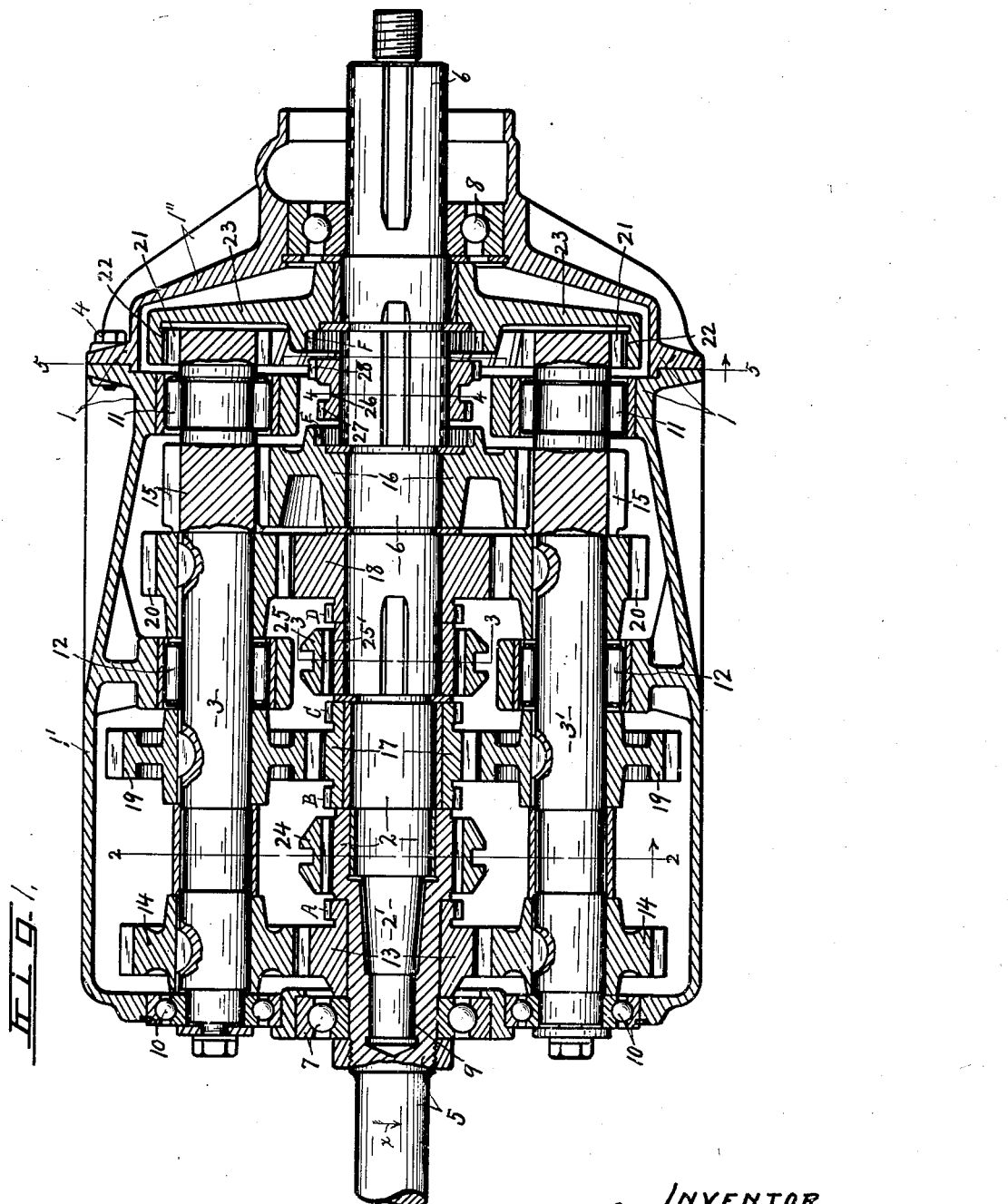

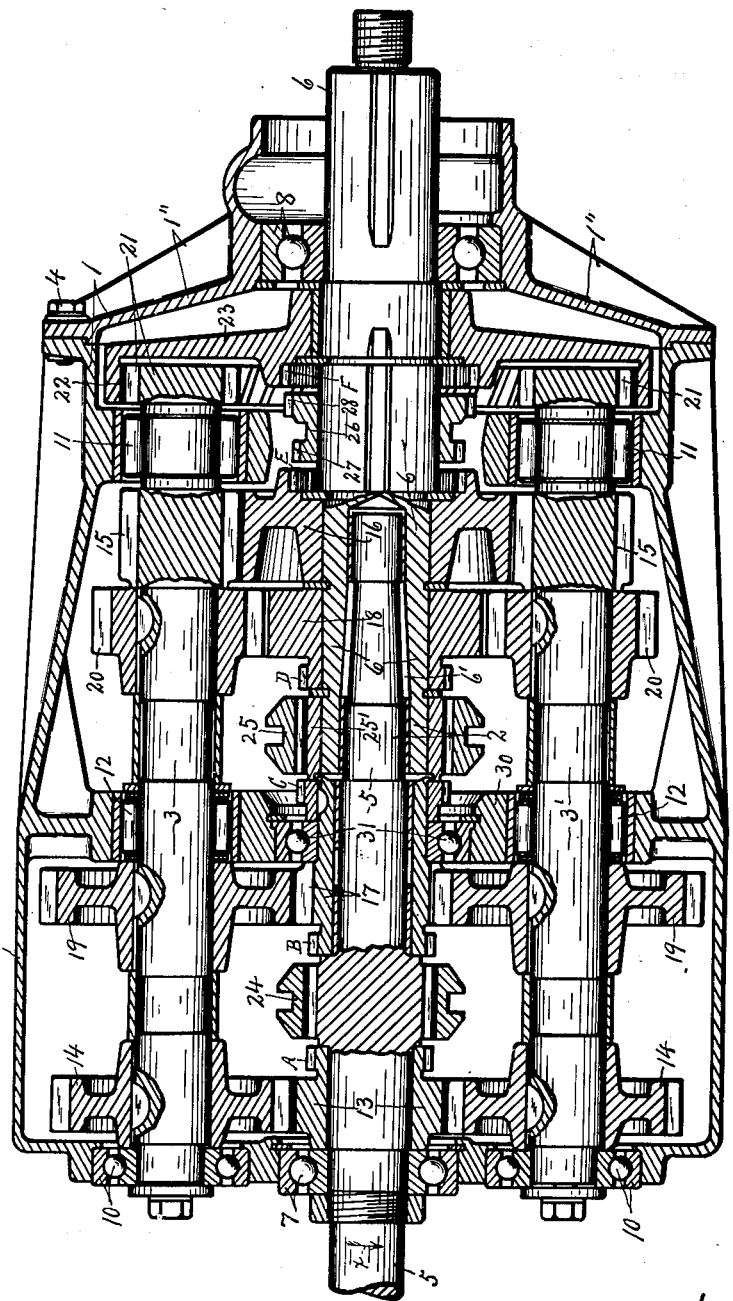

Patented Nov. 20, 1934

1,981,236

UNITED STATES PATENT OFFICE 1,981,236

VARIABLE SPEED POWER TRANSMITTING MECHANISM

Charles H. Logue, Syracuse, N. Y.

Application December 22, 1932, Serial No. 648,399

6 Claims. (Cl. 74—375)

This invention relates to a variable speed power transmitting mechanism adapted to be used more particularly in connection with motor vehicles of the internal combustion engine type, but obviously may be used in other relations if desired.

In mechanisms of this character, it is customary to use co-axial relatively rotatable driving and driven shafts journaled in a suitable gear case and connected respectively to the motor and to the differential gearing or other vehicle driving means, through the medium of a single countershaft and suitable gearing selectively coupled for variable forward speeds and reverse drive resulting in excessive radial thrusts, bending moments and more or less unbalanced condition of the driving and driven shafts when in operation.

The main object of the present invention is to obviate these objectionable results by the use of two or more countershafts arranged in opposed relation to the main shaft sections in such manner that the radial or bending thrusts of their respective gears upon the companion gears of the main shaft sections will be in opposition, and, therefore, substantially balanced.

In other words, I have sought to reduce to a minimum the radial loads and bending moments of the main shaft sections through the medium of the opposed relation of the countershafts and their gear connections with the main shaft and thereby to establish a better balance and more efficient running condition of the entire mechanism than has heretofore been practised.

One of the specific objects is to obtain a maximum number of forward and reverse drive speeds with a minimum number of mechanical parts arranged in compact relation so that the entire transmission device may be comparatively small, light and highly efficient in operation.

Another specific object is to permit the double use of the two main shaft driving gears for producing two different countershaft speeds through the medium of a reversely operated clutch.

Another object is to obtain the reverse drive speeds through the medium of an internal gear driven by both of the countershafts and adapted to transmit rotary motion to the driven shaft through a manually operated clutch.

A further object is to allow all of the gears and countershafts to remain at rest when the engine is idling or when the main drive clutch is in its neutral position.

A further object is to establish a balance of thrust loads on the main shaft and each countershaft for all speed ratios in both forward and reverse drives and at the same time to prevent misalinement of the gears and accidental disengagement of the clutch device.

A further object in the use of the opposed countershafts and their gear connections with the main shaft is to permit the use of shaft sections of smaller diameter than has heretofore been practised and also to reduce the size, weight and cost of the power transmitting mechanism.

Other objects and uses will be brought out in the following description.

In the drawings:—

Figure 1 is a longitudinal horizontal sectional view of a preferred form of variable speed power transmitting mechanism adapted to be used in connection with motor vehicles and more particularly with road vehicles having an internal combustion engine as its motive power.

Figures 2, 3, 4 and 5 are transverse vertical sectional views taken respectively on lines 2—2, 3—3, 4—4 and 5—5, Figure 1.

Figure 6 is a longitudinal horizontal sectional view, similar to that shown in Figure 1, except that it shows certain modifications of bearings for the main shaft sections.

The construction shown in Figure 1 comprises a gear case 1 in which is journaled a main shaft 2 and a plurality of, in this instance two countershafts, 3 and 3' arranged equal distances from and at diametrically opposite sides of the main shaft section 2 parallel therewith.

The gear case 1 may be divided in any suitable manner into sections most convenient for the expeditious assembling of the shafts and gearing therein and, as illustrated, consists of a main section 1' and a removable end section 1'' which is clamped to the adjacent end of the main section by suitable bolts 4.

The main shaft 2 comprises co-axial driving and driven sections 5 and 6 which are respectively journaled in suitable bearings 7 and 8 in the front and rear end walls of the gear case 1 for connection with the engine and with the differential gearing, not shown, of the vehicle.

In the construction shown in Figure 1, the driving shaft section 5 extends from the front end through the bearing 7 a relatively short distance into the gear case and is provided with a central socket 9 extending forwardly from the rear end thereof and coaxial therewith for receiving a reduced forward end 2' of the driven shaft section 6.

It will be noted that the driven shaft section extends from the rear end of the gear case forwardly the entire length of the gear case through the rear end bearing 8 and within the front end bearing 7 so that its front end is actually journaled in the socket 9 and together with the driving shaft section 5 is supported by the front end bearing 7.

The countershafts 3 and 3' extend approximately the full length of the main gear case section 1' and have their front ends journaled in suitable bearings 10 in the front end wall of the gear case, while their rear ends are journaled in suitable bearings 11 projecting inwardly from opposite sides of the rear end of the main gear case section 1', the intermediate portion of said countershafts being journaled in suitable bearings 12 projecting inwardly from the intermediate portions of the main gear case section in longitudinally spaced relation to the front and rear bearings 10 and 11.

A gear 13 is loosely mounted upon the driving shaft section 5 just inside of the bearing 7 and meshes with diametrically opposite gears 14 which are tight on their respective shafts through the medium of suitable keys.

The gear 13 is in constant mesh with its companion gears 14 on the countershafts 3 and 3' and is adapted to be locked to the driving shaft 5 in a manner presently described, for rotating both countershafts at a definite relative speed to but in a reverse direction from that of the drive shaft.

Both of the countershafts 3 and 3' are provided with pinions 15 just inside of the rear bearings 11 and meshing with diametrically opposite sides of a gear 16 which is loosely mounted upon the driven shaft 6 and is adapted to be locked to the shaft section 6 in a manner hereinafter described for transmitting rotary motion thereto.

Additional gears 17 and 18 are loosely mounted upon the driven shaft 6 in axially spaced relation to each other, the gear 17 being also arranged in axially spaced relation to the front gear 13.

The intermediate gear 17 is in constant mesh with diametrically opposite gears 19 which are keyed or otherwise tightly secured to their respective countershafts 3 and 3' adjacent the front ends of the intermediate bearings 12 and is adapted to be locked to the driven shaft 6 for transmitting rotary motion thereto.

The loose gear 18 is in constant mesh with diametrically opposite gears 20 which are keyed or otherwise tightly secured to their respective countershafts 3 and 3' adjacent the rear end of the intermediate bearings 12 or rather between said bearings and the pinions 15 previously described.

The rear ends of both countershafts 3 and 3' are provided with tight pinions 21 in constant mesh with diametrically opposite internal teeth 22 of a gear 23 which is loosely mounted on the shaft section 6 and is adapted to be selectively coupled to said shaft section for reverse drive purposes.

The inner end of the front gear 13 is provided with a clutch member A in the form of peripheral clutch teeth while the front and rear ends of the hub of the intermediate gear 17 are provided with clutch members B and C also in the form of peripheral clutch teeth.

The front end of the hub of the intermediate gear 18 is provided with a clutch member or peripheral clutch teeth D while the rear end of the hub of the gear 16 is provided with an internal clutch member or clutch teeth E.

The reverse drive gear 23 is provided on its front end with internal clutch teeth F in axially spaced relation to the internal clutch member E on the gear 16.

Both of the countershafts 3 and 3' extend rearwardly through and beyond the rear end bearings 11 to bring their respective pinions 21 into mesh with the internal teeth 22 of the reverse drive gear 23 and thereby to assist in resisting radial thrusts and bending moments of both shaft sections.

A clutch member 24 is splined upon the inner end of the driving shaft 5 between the gears 13 and 17 for alternate axial movement in opposite directions into and out of engagement with the adjacent clutch members A and B.

An additional clutch member 25 is splined upon the driven shaft 6 between the gears 17 and 18 for axial movement alternately into and out of engagement with the clutch members C and D.

A third clutch member 26 is splined upon the driven shaft 6 between the forward drive gear 16 and reverse drive gear 23 for axial movement in opposite directions.

The front end of the clutch member 26 is provided with peripheral clutch teeth 27 adapted to engage the internal clutch teeth E when the clutch 26 is moved forwardly, the rear end of said clutch member 26 being provided with peripheral clutch teeth 28 adapted to engage the internal clutch teeth F on the inner end of the hub of the reverse drive gear 23 when the clutch 26 is moved rearwardly from its neutral position.

The clutch member 24 is normally in a neutral position between the companion clutch members A and B and in like manner, the clutch member 25 is normally in a neutral position between its companion clutch members C and D while the clutch member 26 is normally in a neutral position between the internal clutch members E and F.

The clutch members 24, 25 and 26 are all movable axially at will by any suitable shifting means, not shown, but well understood by those skilled in this art, and it will be noted that the gearing described is adapted to selecting six speeds forward and two speeds reverse.

For example, assuming that the driving shaft 5 is being rotated in a clockwise direction indicated by the arrow $x$, Figure 1, and that it is desired to drive the vehicle in first or low speed, then shifting the clutch member 24 rearwardly into engagement with the clutch member B will cause the rotation of both of the countershafts 3 and 3' in a counter-clockwise direction at a definite speed different from that of the main drive shaft, depending upon the ratio of the gears 17 and 19.

Then, shifting the clutch member 26 forwardly to bring its clutch face 27 into engagement with the internal clutch teeth E will cause the driven shaft 6 to be rotated at the same rate of speed as that of the gear 16.

Now, if a second next higher speed of movement of the vehicle is required, the clutch member 24 will be shifted from its neutral position into engagement with the clutch teeth A, thereby transmitting rotary motion from the driving shaft 5 to both countershafts 3 and 3' through the medium of the gears 13 and 14.

This rotation of the countershafts 3 and 3' will be transmitted from the pinions 15 to the gear 16 which, as previously explained, is loose on the driven shaft 6.

It will be observed upon reference to Figures 1 and 3 that the clutch 25 is splined upon a spacing sleeve 25' which, in turn, is keyed to the driven shaft 6 and serves to hold the gears 17 and 18 against axial movement toward each other.

Then, shifting the clutch member 26 from its neutral position forwardly to bring its clutch teeth 27 into engagement with the internal clutch teeth E will cause said gear 16 to rotate the driven shaft 6 at the same rate of speed as the gear.

Again, when it is desired to drive the vehicle under a third or still higher intermediate speed it is simply necessary to shift the clutch member 24 from its neutral position into engagement with the clutch teeth B for driving both of the countershafts 3 and 3' through the medium of the gears 17 and 19 and thereby transmitting rotary motion from both countershafts to the gear 18 through the medium of the gears 20 meshing therewith.

Then, the shifting of the clutch member 25 rearwardly from its neutral position into engagement with the clutch teeth D will cause the rotation of the driven shaft 6 at the same rate of speed as the gear 18.

If a still higher or fourth intermediate forward drive speed is required, the clutch member 24 will be shifted forwardly from its neutral position into engagement with the clutch teeth A for driving both countershafts 3 and 3' and their respective gears 20, which, in turn, serve to drive the gear 18 in a clockwise direction. Then, shifting the clutch member 25 rearwardly into engagement with the clutch teeth D will cause the driven shaft 6 to be rotated at the same rate of speed as the gear 18.

Now, if a still higher or fifth speed of the vehicle is required, the clutch member 24 will be shifted from its neutral position rearwardly into engagement with the clutch teeth B for driving the gear 17 at the same rate of speed as the driving shaft 5.

Then, shifting the clutch member 25 forwardly from its neutral position into engagement with the clutch teeth C on the gear 17 will cause the driven shaft 6 to be rotated at the same speed as the driving shaft 5, thus constituting a direct drive between the driving shaft and driven shaft.

This speed of rotation of the driven shaft may be further increased above that of the driving shaft to produce what may be termed a sixth or over drive speed by simply shifting the clutch member 24 from its neutral position into engagement with the clutch member A and then shifting the clutch member 25 from its neutral position into engagement with the clutch member C.

The gear ratio of the companion gears 13 and 14 and also that of the companion gears 17 and 19 is such that when the clutch 25 is engaged with the clutch teeth C and the clutch 24 is engaged with the clutch teeth A the shaft section 6 will be driven at a higher rate of speed than the driving shaft 5 or at the same speed as the gear 17.

It will be understood from the foregoing description that the ratios of the several sets of constant mesh gears used for the six forward speeds are selected and arranged to give the desired sequence of speeds from the lowest to the highest and vice versa and also to permit the selection of any particular speed through proper manipulation of the clutch members 24, 25 or 26 in the manner previously described.

*Reverse drive*

Provision is also made for reversing the direction of drive of the driven shaft under two different speeds.

For example, if it is desired to rotate the shaft 6 in a counter-clockwise direction at a relatively high speed lower than that of the driving shaft, it is simply necessary to shift the clutch member 24 forwardly into engagement with the clutch member A and then to shift the clutch member 26 rearwardly from its neutral position to engage its clutch member 28 with the internal clutch member F.

Under these conditions, both countershafts 3 and 3' and their pinions 21 will be driven at a definite rate of speed, thereby causing the relatively larger internal gear 23 to be driven at a considerably lower rate of speed than that of the driving shaft so that when the clutch member 28 is engaged with the internal clutch member F, the shaft 6 will be driven at the same speed as the gear 23.

When it is desired to drive the shaft 6 in a counter-clockwise or reverse direction at a lower rate of speed than that previously described, the clutch member 24 will be shifted rearwardly from its neutral position into engagement with the clutch member B, thereby rotating both countershafts 3 and 3' at a lower rate of speed than that of the driving shaft 5 through the medium of the gears 19 and 17, and also rotating the internal gear 23 at a still lower rate of speed through the medium of the pinions 21 on the countershafts.

The clutch 26 is then shifted rearwardly from its neutral position to bring its clutch member 28 into engagement with the clutch member F for rotating the driven shaft 6 at the same rate of speed as the internal gear 23.

*Modification*

The modified construction shown in Figure 6 is quite similar to that shown in Figure 1 previously described, except that the gear case section 1' is provided with a transverse partition 30 having a central bearing 31 in which the hub of the gear 17 is journaled and that the rear end of the drive shaft is reduced and extended through the gear 17 and has its rear end journaled in a coaxial socket 6' in the front end of the driven shaft section 6 which terminates in close proximity to the rear end of the gear 17.

The rear end of the hub of the gear 17 is extended beyond the bearing 31 and upon this extension is keyed or otherwise secured the clutch member C so that the latter becomes in effect a unitary part of the gear 17 instead of forming it integral with said gear, as shown in Figure 1.

Otherwise, the construction and operation responds to the description previously given in connection with Figures 1, 2, 3, 4 and 5.

*Operation*

In both of the constructions shown in Figures 1 to 5 inclusive and in Figure 6, the gears 13 are loosely mounted upon the drive shaft 5 while the gears 17, 18, 16 and 23 are loosely mounted upon the driven shaft 6 while all of the gears 14, 19, 20, 15 and 21 are rigidly or tightly secured to their respective countershafts 3 and 3', thus permitting the main shaft sections 5 and 6 to idle or rotate freely when the clutch members 24, 25 and 26 are in their neutral positions without transmitting any rotary motion to the countershafts 3 and 3' and gears thereon.

In other words, these countershafts with their gears may remain at rest even though the main shaft sections 5 and 6 may be rotated.

First or low speed forward

When it is desired to drive the vehicle under first or low speed, the clutch 24 will be shifted rearwardly into engagement with the clutch member B for rotating both of the gears 19 and their corresponding shafts 3 and 3' together with both pinions 15 which, in turn, transmit rotary motion to the gear 16.

The clutch 26 is then shifted forwardly from its neutral position to bring its clutch member 27 into engagement with the clutch member E for transmitting rotary motion to the driven shaft 6 in the same direction as the drive shaft 5.

Second speed forward

When it is desired to drive the vehicle under second speed, the clutch 24 will be shifted forwardly from its neutral position into engagement with the clutch member A for transmitting rotary motion to the companion gears 13 and 14, resulting in the rotation of the countershafts 3 and 3' and their pinions 15 in a counter-clockwise direction, thereby driving the gears 16 in the same direction as the drive shaft 5.

The clutch 26 will then be shifted forwardly to bring its clutch member 27 into engagement with the clutch member E for transmitting rotary motion to the driven shaft 6 in the same direction as the drive shaft 5.

Third speed forward

When a third speed is required, the clutch 24 will be shifted rearwardly from its neutral position into engagement with the clutch member B, thereby rotating the countershafts 3 and 3' and their pinions 20 through the medium of the gears 17 and 19 resulting in the rotation of the gear 18 in the same direction as the drive shaft 5.

The clutch member 25 is then shifted rearwardly from its neutral position into engagement with the clutch member D of the then rotating gear 18 for transmitting rotary motion to the driven shaft 6.

Fourth speed forward

When it is desired to drive the vehicle under a still higher speed the clutch 24 will be shifted forwardly from its neutral position into engagement with the clutch member A for rotating both of the countershafts 3 and 3' and their pinions 20 through the medium of the gears 13 and 14, resulting in the rotation of the gear 18 in the same direction as the drive shaft.

The clutch 25 will then be shifted rearwardly from its neutral position into engagement with the clutch member D of the gear 18 for transmitting rotary motion to the driven shaft 6 in the same direction as the drive shaft.

Fifth speed direct forward drive

When it is desired to rotate the driven shaft 6 at engine speed or rather at the same speed as the drive shaft 5, the clutch 24 will be shifted rearwardly from its neutral position into engagement with the clutch member B for rotating the gear 17 at the same speed and in the same direction as the drive shaft after which the clutch 25 will be shifted forwardly from its neutral position into engagement with the clutch member C on the rear end of the gear 17, thereby rotating the driven shaft 6 in the same direction and at the same speed as the drive shaft 5.

During this latter operation, both of the countershafts 3 and all of the gears thereon will be rotated in a counter-clockwise direction through the medium of the gears 17 and 19, while the gears 13, 18 and 16 will be free to rotate upon their respective shafts 5 and 6 by reason of the fact that they are loosely mounted thereon.

Sixth speed over-drive

When it is desired to further increase the speed of rotation of the driven shaft 6, the clutch 24 will be shifted forwardly from its neutral position into engagement with the clutch member A for rotating both of the countershafts 3 and 3' at the same speed as, but in a reverse direction from, the drive shaft 5, thus rotating the gear 17 at a relatively higher speed than the shafts 3 and 3' through the medium of the gears 19.

The clutch 25 is then shifted forwardly from its neutral position into engagement with the clutch member C for transmitting rotary motion from the gear 17 to the driven shaft 6 at a much higher speed than that of the drive shaft.

High speed reverse

For high speed reverse drive, the clutch 24 will be shifted into engagement with the clutch member A, thereby driving both countershafts and their respective pinions 21 through the medium of the gears 13 and 14. The pinions 21 serve to drive the internal gear 23.

The clutch member 26 is then shifted rearwardly into engagement with the internal clutch member F for transmitting rotary motion from the internal gear 23 to the driven shaft 6.

Low speed reverse

When it is desired to rotate the driven shaft at relatively low reverse speed, the clutch 24 will be shifted into engagement with the clutch member B, thereby driving both countershafts 3 and 3' and their respective pinions 21 through the medium of the gears 17 and 19, the pinions 21 serving to rotate the internal gear 23.

The clutch 26 will then be shifted from its neutral position rearwardly into engagement with the internal clutch member F for transmitting rotary motion to the driven shaft 6.

It will be noted that all of the loose gears 13, 17, 18, 16 and 23 are co-axial with the main shaft 2 and that the radial thrusts and bending moments are opposed by the corresponding countershaft gears engaged therewith, thus permitting lighter stock to be used for the main shaft and countershaft and also permitting all of the parts of the power transmitting mechanism to be brought into compact space.

It will also be noted that the clutch member 24 and its companion clutch members A and B may be used for different speed transmissions from the driving shaft to the driven shaft. In like manner, the clutch 25 and companion clutch members C and D may be used for still further differential speed drive and that the clutch member 26 and its companion clutch members E and F may be used for one speed forward drive and for reverse drive.

The various companion gears for transmitting rotary motion from the drive shaft to the countershaft or vice versa are such ratio as to produce four speeds forward, one direct drive through the main shaft, one over-drive, and two reverse speeds, all of which operations are accomplished through the medium of the three clutch members 24, 25 and 26.

It is evident, however, that the gear ratios may be varied in any suitable manner to accomplish the same forward speed and reverse speed drive of the driven shaft and that the number of speeds forward and reverse may be varied without departing from the spirit of the invention.

What I claim is:

1. In a variable speed power transmitting mechanism for motor vehicles, the combination with co-axial driving and driven elements having adjacent ends journaled one upon the other, and a countershaft, of axially spaced loose gears on the driving and driven shafts respectively, tight gears on the countershaft in constant mesh with said loose gears, a clutch splined on the driving shaft and movable alternately into and out of engagement with the loose gears, an additional loose gear on the driven shaft, an additional tight gear on the countershaft in constant mesh with the additional loose gear, and a clutch splined on the driven shaft and movable at will into and out of engagement with said additional loose gear.

2. In a variable speed power transmitting mechanism for motor vehicles, the combination with co-axial driving and driven shafts, and a countershaft, of a loose gear on the driving shaft, a tight gear on the countershaft in constant mesh with the loose gear, a clutch splined on the driving shaft and movable at will into and out of engagement with the loose gear, an internal loose gear on the driven shaft, a second tight gear on the countershaft in constant mesh with the internal loose gear, and a clutch splined on the driven shaft and movable at will into and out of engagement with the internal loose gear for reverse drive.

3. In a variable speed power transmitting mechanism the combination with relatively rotatable co-axial driving and driven shafts, and a countershaft having tight gears of different diametral pitch therein, of a loose gear on the driving shaft in constant mesh with one of said tight gears, a loose gear on the driven shaft in constant mesh with another one of said tight gears, a clutch on the driving shaft selectively movable into and out of engagement with said loose gears for rotating the countershaft at different speeds, and means for transmitting rotary motion from the countershaft to the driven shaft.

4. In a variable speed power transmitting mechanism, the combination with relatively rotatable co-axial driving and driven shafts and a countershaft, of loose gears on the driving and driven shafts respectively, tight gears on the countershaft in constant mesh with their respective loose gears, a clutch splined on the driving shaft and movable into and out of engagement with one of the loose gears, and an additional clutch splined on the driven shaft and movable into and out of engagement with the other loose gear.

5. In a variable speed power transmitting mechanism, the combination with relatively rotatable co-axial driving and driven shafts and a countershaft, of a forward-drive loose gear on the driving shaft, a reverse-drive loose gear on the driven shaft, tight gears on the countershaft in constant mesh with their respective loose gears, and separate clutches splined on the driving shaft and driven shaft respectively and movable into and out of engagement with the corresponding loose gears.

6. In a variable speed power transmitting mechanism, the combination with relatively rotatable co-axial driving and driven shafts and a countershaft, of a forward-drive loose gear on the driven shaft, a reverse-drive loose gear on the driven shaft, tight gears on the countershaft in constant mesh with said loose gears, and separate clutches splined respectively on the driving shaft and driven shaft and movable into and out of engagement with their corresponding loose gears.

CHARLES H. LOGUE.